No. 655,949. Patented Aug. 14, 1900.
M. M. BAILEY.
VEHICLE WHEEL.
(Application filed Jan. 8, 1900.)
(No Model.)
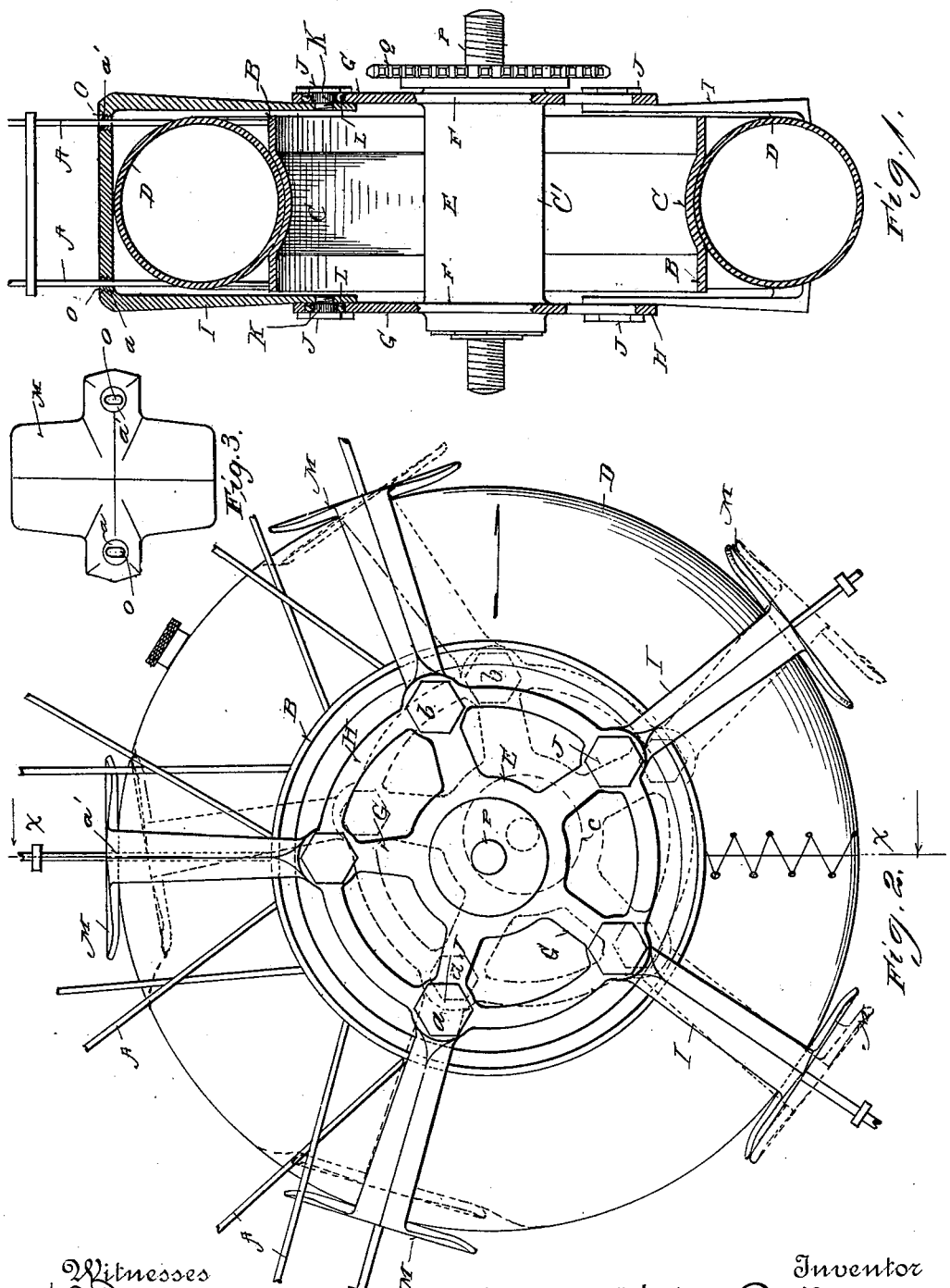
Witnesses
J. D. Dawley
W. M. McNair.
Inventor
Marion Milton Bailey,
By his Attorney
H. A. Toulmin.

UNITED STATES PATENT OFFICE.

MARION MILTON BAILEY, OF CHILLICOTHE, OHIO, ASSIGNOR OF SEVENTY-ONE ONE-HUNDREDTHS TO J. S. HARSHMAN AND H. E. MURPHY, OF SPRINGFIELD, OHIO.

VEHICLE-WHEEL.

SPECIFICATION forming part of Letters Patent No. 655,949, dated August 14, 1900.

Application filed January 8, 1900. Serial No. 650. (No model.)

*To all whom it may concern:*

Be it known that I, MARION MILTON BAILEY, a citizen of the United States, residing at Chillicothe, in the county of Ross and State of Ohio, have invented certain new and useful Improvements in Vehicle-Wheels, of which the following is a specification, reference being had therein to the accompanying drawings.

This invention relates to certain new and useful improvements in vehicle-wheels.

The general object of my invention is to provide a construction whereby the hub of the vehicle may be thrown forward or backward of the wheel-center and has reference to a different form of construction from that embodied in my application executed November 28, 1899, particularly with reference to the construction of an auxiliary hub and the relation of hangers to said hub, such hangers being carried by a primary hub.

My invention also relates to details of construction and arrangement hereinafter appearing, and particularly pointed out in the claims.

In the accompanying drawings, on which like reference-letters indicate corresponding parts, Figure 1 represents a sectional view on the line *x x* of Fig. 2 looking in the direction of the arrows; Fig. 2, a detail view showing the central portion of a wheel with my improvements applied thereto and also illustrating the operation of my improvements, and Fig. 3 a plan view of one of the hangers.

In my application executed November 28, 1899, the primary hub carried hangers which fit within rings forming the ends of an auxiliary hub, and the hangers had a bearing against such rings, so as to prevent lateral movement of the primary hub with respect to the wheel proper. In the present application the auxiliary hub is composed of a solid channel-iron, to which the spokes of the wheel proper are attached, while the hangers projecting from the inner hub structure are outside of the auxiliary hub and are mounted on spokes which act as guides to hold the internal or primary hub from lateral displacement, yet which at the same time will permit the hub to partially rotate relatively to the auxiliary hub, as will hereinafter appear.

The letter A represents ordinary spokes adapted to extend into the ordinary felly in any approved manner. The inner ends of these spokes are secured to an auxiliary hub B in any suitable manner. This hub is preferably annular and is convex in cross-section on the interior and concave on its exterior, as shown at C in Fig. 1. The spokes project upward from near the edges of this auxiliary hub, so that there is ample space between them, in which fits a resilient body D, such body being inserted between the spokes from one side of the wheel in one long piece, after which its ends are brought together and secured in such position in the usual or any suitable manner. In the form illustrated the resilient body is a pneumatic tube.

Within the auxiliary hub B is mounted a primary hub C', consisting of a hub-sleeve E and annular flanges F, having radial arms G, which unite at their outer ends with an annular ring H. Hangers I are pivoted to the radial arms by means of a ball-bearing consisting of a stud-bolt J, formed to constitute a ball-cone K, upon which balls L ride, it being understood that the stud-hole in the radial arms is sufficiently large to accommodate the stud-bolt and balls. Such balls are prevented from escaping by the hanger on one side and by the head of the stud-bolt J on the other side. These hangers extend on the outside of the auxiliary hub B and over the top of the resilient body D and have a bearing thereon, as illustrated in Figs. 1 and 2. The upper or bearing portion of these hangers is extended in a circumferential direction, as illustrated at M. The bearing-surface of these hangers is slightly rounded outward from the resilient body, so as to prevent digging into such resilient body when it is brought down upon it by reason of the weight being applied to the primary hub, as will hereinafter appear. It will be observed that each of these hangers has a pair of openings in its outer end, as shown at O, through which extend a pair of spokes A. These spokes act as guides for the hangers and also prevent any lateral movement of the primary hub, although permitting the hangers to swing more or less in order that the primary hub may partially rotate independently of the auxiliary hub. In order that there may be no rattling between the spokes and hangers, I provide sleeves a', formed of red hematite or other suitable material, which fit snugly within the openings O and through which said spokes pass. The axle P extends through the hub-sleeve E and is adapted to carry the weight applied to the wheel, as is usual in this class of vehicle-wheels. Upon the hub-sleeve is mounted a sprocket-gear Q, which is adapted to drive the primary hub and through its connection with the auxiliary hub the wheel proper.

I will now refer to the operation of my improvements.

As the weight is applied to the axle the primary hub will have a tendency to drop in a vertical line, and the hangers, particularly those above a horizontal line extending through the center of the wheel, will press into the resilient body, which will act as a cushion for the load. Let it be supposed that the sprocket-wheel is driven by means of an ordinary sprocket-chain. (Not shown.) This will cause the primary hub to rotate, and since such hub is connected with the resilient body mounted upon the auxiliary hub by pivoted hangers such hangers will permit the primary hub to partially rotate before acting to rotate the wheel proper. Such partial rotation of the primary hub will cause the pivotal point a to swing more nearly into line with the center of the wheel and the spokes upon which the hanger, to the left, as indicated in Fig. 2, is slidably mounted. This will tend to lengthen the distance between the bearing M of such hanger and the true wheel-center. At the same time the pivotal point a is moving into line, as above described, the pivotal point b will move from its full-line position to its dotted-line position. This movement will shorten the distance between the bearing M of the hanger, to the right, as viewed in Fig. 2, and the true center of the wheel. Consequently the primary hub will be drawn to one side of its true center, as shown at c. Inasmuch as the load is applied to the axle P, such load will be applied to the resilient body, and consequently to the wheel proper, at one side of the true center of said wheel. Thus the wheel will have a tendency to move in the direction of the arrow, as indicated in Fig. 2. Should the sprocket-wheel be rotated in the opposite direction or be retarded, the primary hub will relatively rotate in the opposite direction to the wheel proper. This action will cause the pivotal point a to be moved out of line with such center in the manner just described with regard to the point b, so that the primary hub will be thrown to the opposite side of the wheel-center. This will cause the load to have a retarding effect on the movement of the wheel. Thus with this present construction I accomplish the same results as with the device illustrated and described in my application executed November 28, 1899, although the details of construction are unlike those of said application.

Having thus fully described my invention, what I claim as new, and desire to secure by Letters Patent, is—

1. In a vehicle-wheel, the combination with an auxiliary hub having spokes secured near the outer edges of said hub, of a resilient body mounted between said spokes on said auxiliary hub, a primary hub within said auxiliary hub, hangers connected with said primary hub and extending over the resilient body and on the outside of said auxiliary hub.

2. In a vehicle-wheel, the combination with an auxiliary hub with spokes secured thereto, of a resilient body carried by said auxiliary hub, a primary hub within said auxiliary hub carrying pivoted hangers, said hangers adapted to extend over said resilient body and on the outside of said auxiliary hub, all substantially as shown and described.

3. In a vehicle-wheel, the combination with an auxiliary hub, of a resilient body carried by said auxiliary hub, a primary hub within said auxiliary hub carrying a driving-gear, hangers pivotally engaging with said primary hub and adapted to extend over said resilient body and on the outside of said auxiliary hub, said hangers also having one or more holes therein through which a spoke of the wheel proper may pass, said spoke acting as a guide for the hanger, all substantially as shown and described.

4. In a vehicle-wheel, the combination with an auxiliary hub, of a resilient body carried by said hub, a primary hub mounted within said auxiliary hub, hangers pivotally connected with said primary hub and adapted to extend over said resilient body and outside of said auxiliary hub to support said primary hub, a bearing-surface for the outer extremity of said hangers having a pair of holes therein, a pair of spokes opposite each other adapted to pass through said holes to act as guides for said hangers, whereby the hub is held in its lateral position, means for partially rotating said primary hub relatively to said auxiliary hub, all substantially as shown and described.

5. In a vehicle-wheel, the combination with an auxiliary hub, of a resilient body carried by said auxiliary hub, a primary hub within said auxiliary hub having radial arms, hangers pivotally connected with said radial arms by ball-bearings, said hangers extending over said resilient body and on the outside of the outer edges of said auxiliary hub, said hangers having bearing-surfaces at their outer ends with a pair of holes or openings therein, a pair of spokes adapted to extend through said holes whereby the hangers are held in position laterally, yet may slide in and out radially, and means for partially rotating said primary hub relatively to said auxiliary hub, whereby said former hub will be thrown either to one side or the other of the wheel-center according to the direction of rotation of the primary hub with respect to the auxiliary hub, all substantially as shown and described.

In testimony whereof I affix my signature in presence of two witnesses.

MARION MILTON BAILEY.

Witnesses:
B. B. ESTERLINE,
F. W. SCHAEFER.